W. SYMONS.
METHOD OF MAKING CONCRETE LINED PIPE.
APPLICATION FILED DEC. 1, 1920.
1,388,619.
Patented Aug. 23, 1921.
2 SHEETS—SHEET 1.
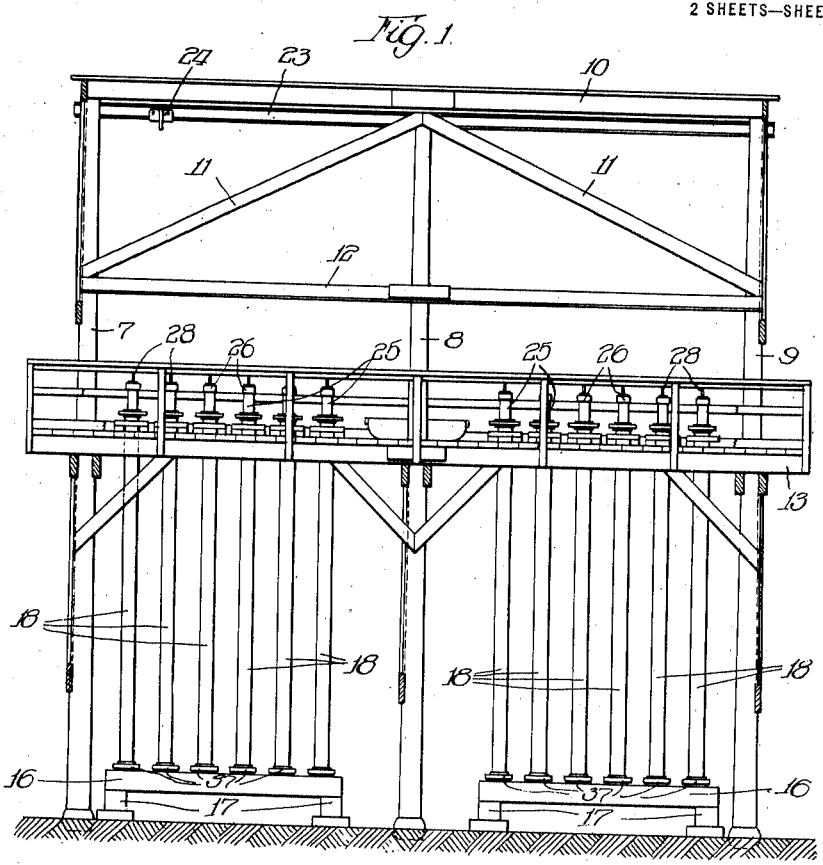
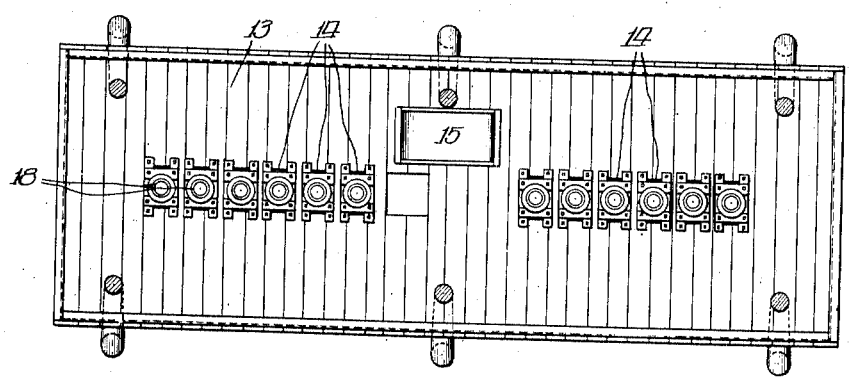

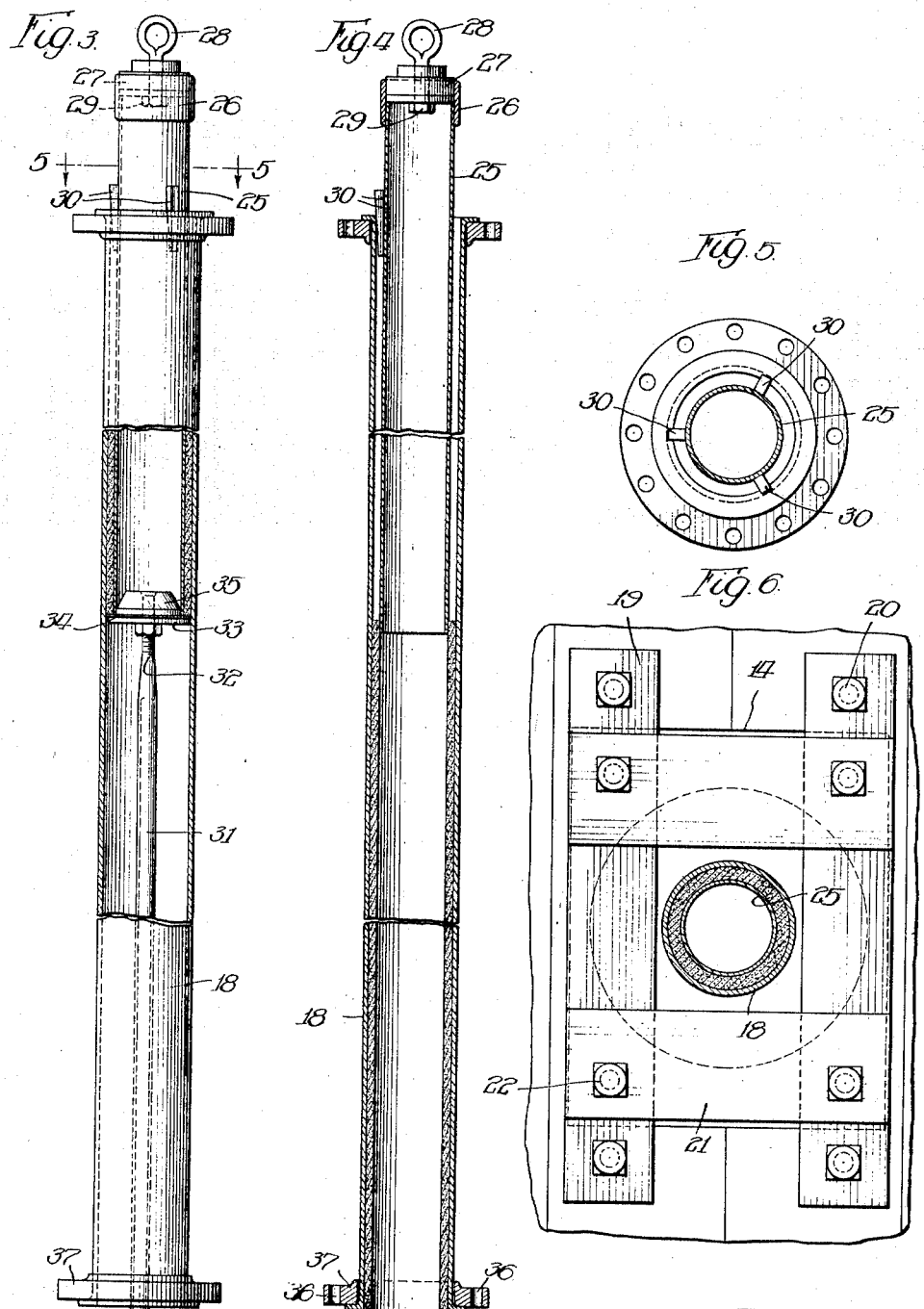

UNITED STATES PATENT OFFICE.

WILLIAM SYMONS, OF IRON RIVER, MICHIGAN.

METHOD OF MAKING CONCRETE-LINED PIPE.

1,388,619.   Specification of Letters Patent.   Patented Aug. 23, 1921.

Application filed December 1, 1920. Serial No. 427,573.

*To all whom it may concern:*

Be it known that I, WILLIAM SYMONS, a citizen of the United States, residing at Iron River, in the county of Iron and State of Michigan, have invented certain new and useful Improvements in Methods of Making Concrete-Lined Pipe, of which the following is a specification.

This invention comprises a new and improved concrete lined pipe and the means and method for construction of the same. In the transmission of liquids of various characters containing acid or other materials which attack metallic pipes, concrete pipes are used in certain circumstances. However, where extra strength or ability to stand shocks is necessary, as for example in column piping in mines, it has been found that the concrete lining of iron pipes affords a more efficient construction. The concrete lining should be relatively thin so as not to unnecessarily reduce the capacity of the pipe. It should be smooth in order to have a high hydraulic coefficient and it should be sufficiently dense to prevent the injurious elements in the liquid from passing through the lining and attacking the pipe.

It is an object of the present invention to provide a concrete lined pipe which affords all of these desired results and it is a further object to provide a novel and efficient means and method for constructing such a pipe. It is another object to provide a pipe lining plant which is efficient in its operation and is capable of rapid work. It is also an object to provide a method of lining pipes which may be operated by relatively unskilled labor and which will produce uniformly lined pipes. Other and further objects will appear as the description proceeds.

I have illustrated certain preferred embodiments of my invention in the accompanying drawings in which—

Figure 1 is a side view of a pipe lining plant;

Fig. 2 is a plan view of the lower portion of Fig. 1;

Fig. 3 is a view partly broken away showing the method of lining the first half of the pipe;

Fig. 4 is a view similar to Fig. 3 but illustrating the method of lining the second half of the pipe;

Fig. 5 is a view taken on line 5—5 of Fig. 3; and,

Fig. 6 is an enlarged fragmentary view illustrating the method of blocking in position the upper end of the pipe.

The plant shown in Figs. 1 and 2 comprises a series of trestles 7, 8, and 9, their upper ends being connected by the beams 10 and being braced by the members 11 and 12. A platform 13 is supported by the trestles, the platform being provided with a plurality of hatchways 14. A trough 15 for mixing cement is placed on the platform. Below the hatchways 14 are placed sills 16 which are supported on blocks 17. The pipes 18 have their lower ends supported on the sills 16 and their upper ends are blocked in place, as shown in Fig. 6, by the longitudinal blocks 19, which are retained in place by the loosely fitting bolts 20 which pass into holes in the platform floor. The cross blocks 21 are similarly retained in place by the bolts 22 fitting into the longitudinal blocks 19. The trolleyway 23 extends lengthwise of the trestles adjacent their top and is provided with the carrier 24 with which ropes and pulleys for handling the pipes may be connected.

Tapered pipe cores 25, as shown in Figs. 3 and 4, are provided. The upper ends of these cores are fitted with pipe couplings 26, and with a pipe plug 27 in the center of which a hole is drilled to receive the swivel eye-bolt 28 which is retained in place by the nut 29. Wedges 30 are provided for use in centering the core in the pipe.

As shown in Fig. 3, a stop plate and centering cone are provided for use when lining the first half of the pipe. This device comprises the pipe 31 having the threaded stub 32 welded to its upper end. A nut is threaded on the stub 32 and above the nut is placed a disk 33 slightly smaller than the interior of the pipe. The gasket 34 is placed above this disk and on the top of the gasket is screwed the truncated cone 35 having a short cylindrical section at its base, the diameter of this cylindrical section being slightly less than the interior diameter of the core pipe.

In the use of my method of lining pipes, pipes are placed vertically with their lower ends resting upon the sill 16, and their upper ends passing through the hatchways 14 in the platform and blocked in place. The lower end of the pipe may be retained in place by dropping pins through the bolt holes 36 in the pipe flange 37, the pins fitting into sockets in the sill.

In the first part of the operation the stop plate construction extends upward interiorly of the pipe, the lower end of the member 31 being held in a socket in the sill 16. The gasket 34 serves to make a substantially water tight connection with the interior of the pipe. The core pipe 25 is lowered downwardly into the pipe, its lower end seating on the stop plate 33, and being centered by the cone 35. The upper end of the core 25 is blocked in place by the wedges 30 so as to be uniformly spaced from the inner walls of the pipe. The concrete mixture is poured between the core and the pipe and is tamped or rammed with rods and may also be compacted by lightly hammering the side of the pipe. The wedges are removed when the concrete reaches the top of the pipe and the concrete is finished smooth and flush with the face of the pipe.

I have found a mixture of one part Portland cement to one and one-half parts clean sharp sand to be particularly suited for pipe lining. The sand should pass through a one-fourth inch mesh screen and be free from loam, clay or vegetable matter. The pipe core is wiped with a mixture of one part linseed oil and one part kerosene oil before each time it is used to prevent rust and to keep it from adhering to the concrete.

The core is lifted approximatley an inch and, turned a short distance, allowed to settle back to rest about two hours after pouring when linings are poured at an average outside temperature of 60° F. Cores are afterward raised at intervals of about one hour, turned slightly and allowed to settle back and are removed about eight hours after pouring. As soon as the lining has hardened sufficiently to permit the pipe to be handled safely without danger to the lining, the pipes are lowered enough to clear the platform 13, the stop plate assembly is removed, and the pipes are reversed and set up as before with the opposite end upward.

After thoroughly washing the inner end of the first portion of the lining, the core pipe is lowered carefully inside the column pipe, its lower end being inserted approximately an inch into the finished lining. Centering wedges 30 are driven at the top and the second half is then poured in the same manner as the first half.

The pipe cores are preferably made of extra heavy pipe and are tapered. Their outer surface is turned smooth and is slightly tapered. For example, a six inch pipe would be used as a core if lining an eight inch pipe. The outer surface of the core would be preferably tapered from $6\frac{3}{16}$ diameter at the lower end to $6\frac{3}{8}$ diameter at nine feet above the lower end. This would be for use in lining an eighteen foot pipe section.

Obviously any desired number of pipes may be lined at one time. The structure shown in Figs. 1 and 2 has been found to be of sufficient size for continuous operation in lining pipes by my method. In lining eighteen foot lengths of eight inch pipe with cores of the dimensions given, it was found that the lining of each pipe required approximately $2\frac{4}{10}$ cubic feet of concrete which amount weighed about 370 pounds. The concrete lining was approximately $\frac{1}{8}$ of an inch thick.

The lining of pipes with cylindrical cores presents many difficulties in regard to the removal of the core. In the use of tapered cores the inner cross section of the finished pipe varies and the smallest cross section is substantially the measure of the capacity of the pipe. If the taper of the core is sufficient to accomplish the desired purpose and a pipe section of usual length is lined by a single pouring by a full length core the area of the pipe at the small end of the core suffers a serious diminution. Moreover the cores are awkward to handle and the problem of securing an evenly compacted pouring in the long and restricted space is extremely difficult. An additional difficulty arises from the fact that the opening in one end of the pipe will be greater than at the other end. This would necessitate placing adjacent pipes end for end to avoid jogs in the interior surfaces with their consequent serious effect upon the liquid flow in the pipe.

These several difficulties are avoided by my method of construction. By using a core of one half the pipe length the core may be properly tapered without great diminution in effective area of the pipe. The core is easily handled and the shorter length of pouring makes it easier to secure a compact and uniform lining. The smaller portion of the pipe area is at its center and its two ends are identical so that the pipe sections may be used without special placing of adjacent ends. It is also possible to line sections of greater length by this method than is practically possible with a full length core.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. The method of lining a pipe section with concrete comprising placing a tapered core in said pipe, bracing said core substantially equidistantly from the pipe walls, filling the space between the core and pipe with concrete, periodically lifting the core a short distance and permitting it to settle back in place during the setting of the concrete.

2. The method of lining a pipe section with concrete comprising placing a core in said pipe extending from one end of the pipe to approximately midway of the length of the pipe, filling the space between said core and pipe with concrete and, after the cement has set, removing the core and reinserting it from the opposite end and filling the space between the core and pipe with concrete.

3. The method of lining a pipe section with concrete comprising placing a tapered core in said pipe extending from one end of the pipe to approximately midway of the length of the pipe, filling the space between said core and pipe with concrete, and, after the cement has set, removing the core and reinserting it from the opposite end and filling the space between the core and pipe with concrete.

4. The method of lining a pipe section with concrete comprising placing a tapered core in said pipe extending from one end of the pipe to approximately midway of the length of the pipe, filling the space between said core and pipe with concrete and, after the cement has set, removing the core, reversing the pipe and reinserting the core from the opposite end and filling the space between the core and pipe with concrete, the two concrete fillings forming a continuous concrete layer upon the inner side of the pipe.

5. The method of lining a pipe section with concrete comprising placing in the pipe a stop plate having a centering guide thereon, providing the stop plate with means making substantially water tight contact with the inner wall of the pipe, inserting a core having its lower end centered by said guide, and filling the space between the core and pipe and above the stop plate with concrete.

6. The method of lining a pipe section with concrete comprising placing a stop plate in the pipe substantially midway of its length, the stop plate having centering means upon one face thereof concentric with the pipe, inserting a core into the pipe from one end in such manner that its lower end rests upon the stop plate and is centered by the centering means, providing means to maintain the upper end of the core concentric with the pipe and filling the space between the pipe and core with concrete, removing the stop plate and core after the concrete has set, reversing the pipe, reinserting the core from the opposite end of the pipe, its lower end being engaged and maintained concentric by engagement with the inner end of the initial concrete filling, and filling the space defined by the end of said filling, the core and pipe with concrete.

7. The method of lining a pipe section with concrete comprising placing a core in said pipe extending from one end of the pipe to approximately midway of the length of the pipe, filling the space between said core and pipe with concrete, periodically moving the core during the time of setting of the concrete, and, after the cement has set, removing the core and reinserting it from the opposite end and filling the space between the core and pipe with concrete.

8. The method of lining a pipe section with concrete comprising placing a stop plate in the pipe substantially midway of its length, the stop plate having centering means upon one face thereof concentric with the pipe, inserting a core into the pipe from one end in such manner that its lower end rests upon the stop plate and is centered by the centering means, providing means to maintain the upper end of the core concentric with the pipe and filling the space between the pipe and core with concrete, periodically moving the core during the time of setting of the concrete, removing the stop plate and core after the concrete has set, reversing the pipe, reinserting the core from the opposite end of the pipe, its lower end being engaged and maintained concentric by engagement with the inner end of the initial concrete filling, and filling the space defined by the end of said filling, the core and the pipe with concrete.

9. The method of lining a pipe section with concrete comprising placing a stop plate in the pipe substantially midway of its length, the stop plate having centering means upon one face thereof concentric with the pipe, inserting a core into the pipe from one end in such manner that its lower end rests upon the stop plate and is centered by the centering means, providing means to maintain the upper end of the core concentric with the pipe and filling the space between the pipe and core with concrete, removing the stop plate and core after the concrete has set, thoroughly washing the inner end of the first concrete lining section, reversing the pipe, reinserting the core from the opposite end of the pipe, its lower end being engaged and maintained concentric by engagement with the inner end of the initial concrete filling, and filling the space defined by the end of said filling, the core and the pipe with concrete.

Signed at Ironwood, Michigan, this 23rd day of November, 1920.

WILLIAM SYMONS.